(12) United States Patent
Li et al.

(10) Patent No.: US 8,400,523 B2
(45) Date of Patent: Mar. 19, 2013

(54) WHITE BALANCE METHOD AND WHITE BALANCE DEVICE

(75) Inventors: Yan Li, Beijing (CN); Wenbo Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 13/236,878

(22) Filed: Sep. 20, 2011

(65) Prior Publication Data

US 2012/0086828 A1  Apr. 12, 2012

(30) Foreign Application Priority Data

Oct. 9, 2010  (CN) .......................... 2010 1 0501074

(51) Int. Cl.
*H04N 9/73* (2006.01)
*H04N 5/228* (2006.01)

(52) U.S. Cl. .................................. 348/223.1; 348/222.1

(58) Field of Classification Search ............... 348/223.1, 348/222.1, 239; 382/167, 103–105, 170, 382/173–176, 190, 192–195, 199, 266–275, 382/298, 299
See application file for complete search history.

(56) References Cited

U.S. PATENT DOCUMENTS 6,608,941 B1 *   8/2003  Suzuki et al. ................. 382/272
2004/0208363 A1  10/2004  Berge et al.
2005/0041103 A1 *  2/2005  Kinjo .......................... 348/207.1
2012/0092494 A1 *  4/2012  Garoutte et al. .............. 348/143
2012/0281101 A1 * 11/2012  Fujinawa et al. .......... 348/207.1

FOREIGN PATENT DOCUMENTS

JP         2007-43364        2/2007

OTHER PUBLICATIONS

Zhengyou Zhang, et al., "Whiteboard Scanning and Image Enhancement", Microsoft Research, Technical Report MSR-TR-2003-39, Jun. 2003, 25 pages.
Jun-yan Huo, et al., "Robust Automatic White Balance Algorithm using Gray Color Points in Images", IEEE Transactions on Consumer Electronics, vol. 52, No. 2, May 2006, pp. 541-546.

* cited by examiner

*Primary Examiner* — Tuan Ho
*Assistant Examiner* — Chan Nguyen
(74) *Attorney, Agent, or Firm* — Oblon, Spivak, McClelland, Maier & Neustadt, L.L.P.

(57) ABSTRACT

Disclosed are a white balance device and a white balance method. The device comprises a unit used to extract background pixels of an image; a unit used to obtain representative color of background; a unit for determining a global magnification ratio of the background pixels; a unit used to carry out pre-adjustment with regard to original color of each of the background pixels; a unit used to, for each of the background pixels, determine expected final background color of the corresponding background pixel, and then determine an accurate magnification ratio of the corresponding background pixel; and a unit used to, for each of the background pixels, carry out adjustment with regard to the original color of the corresponding background pixel by using the accurate magnification ratio of the corresponding background pixel.

10 Claims, 6 Drawing Sheets

ORIGINAL WHITEBOARD IMAGE

WHITEBOARD IMAGE CAPTURED BY CAMERA HEAD

FIG.1
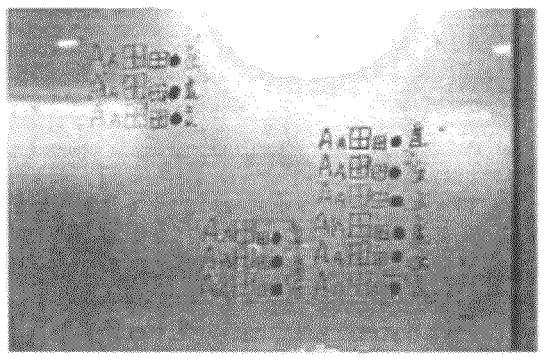
ORIGINAL
WHITEBOARD IMAGE
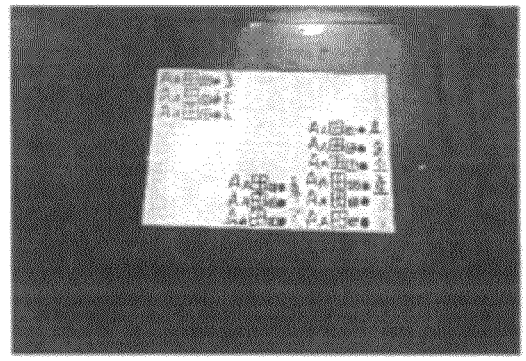
WHITEBOARD
IMAGE CAPTURED
BY CAMERA HEAD

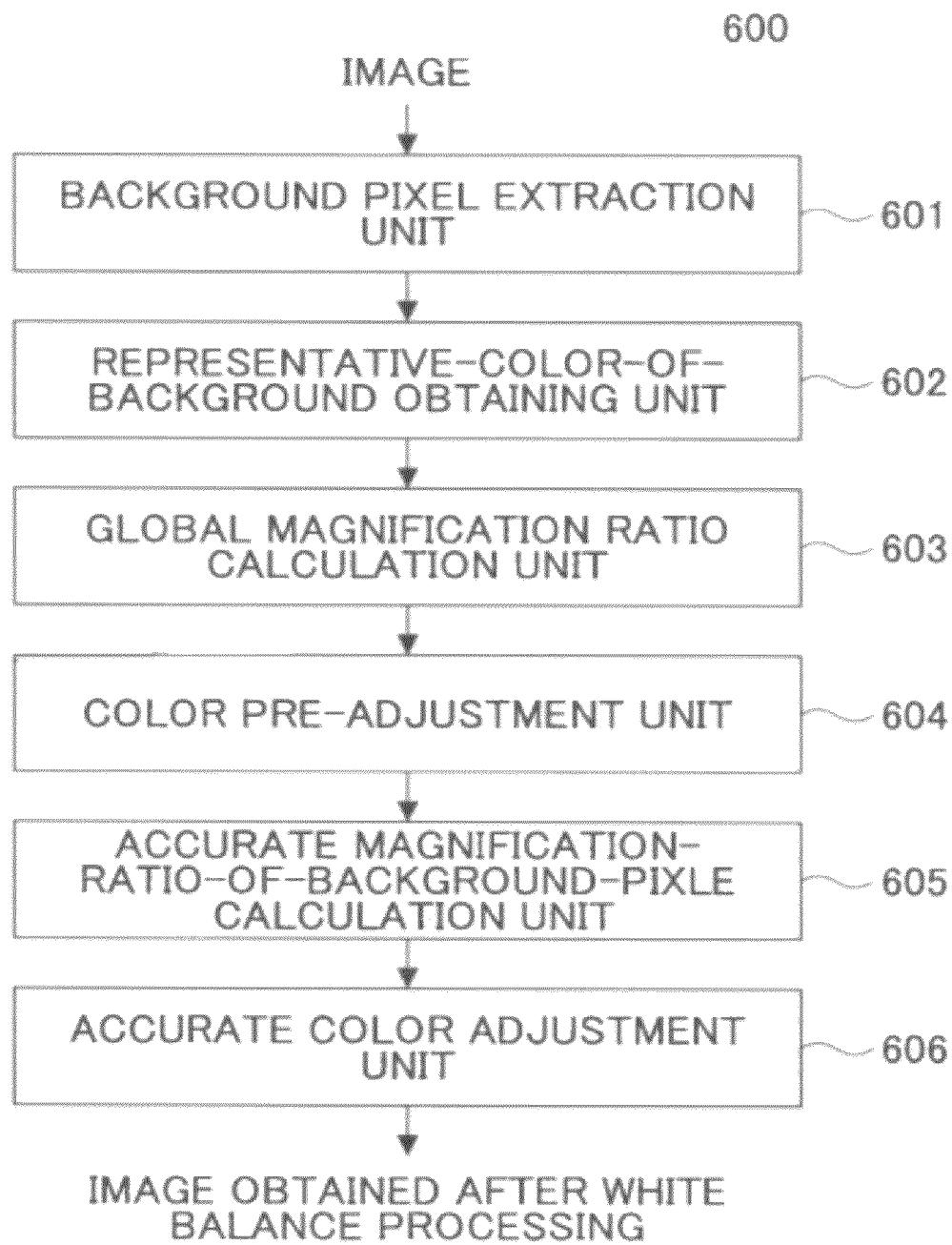

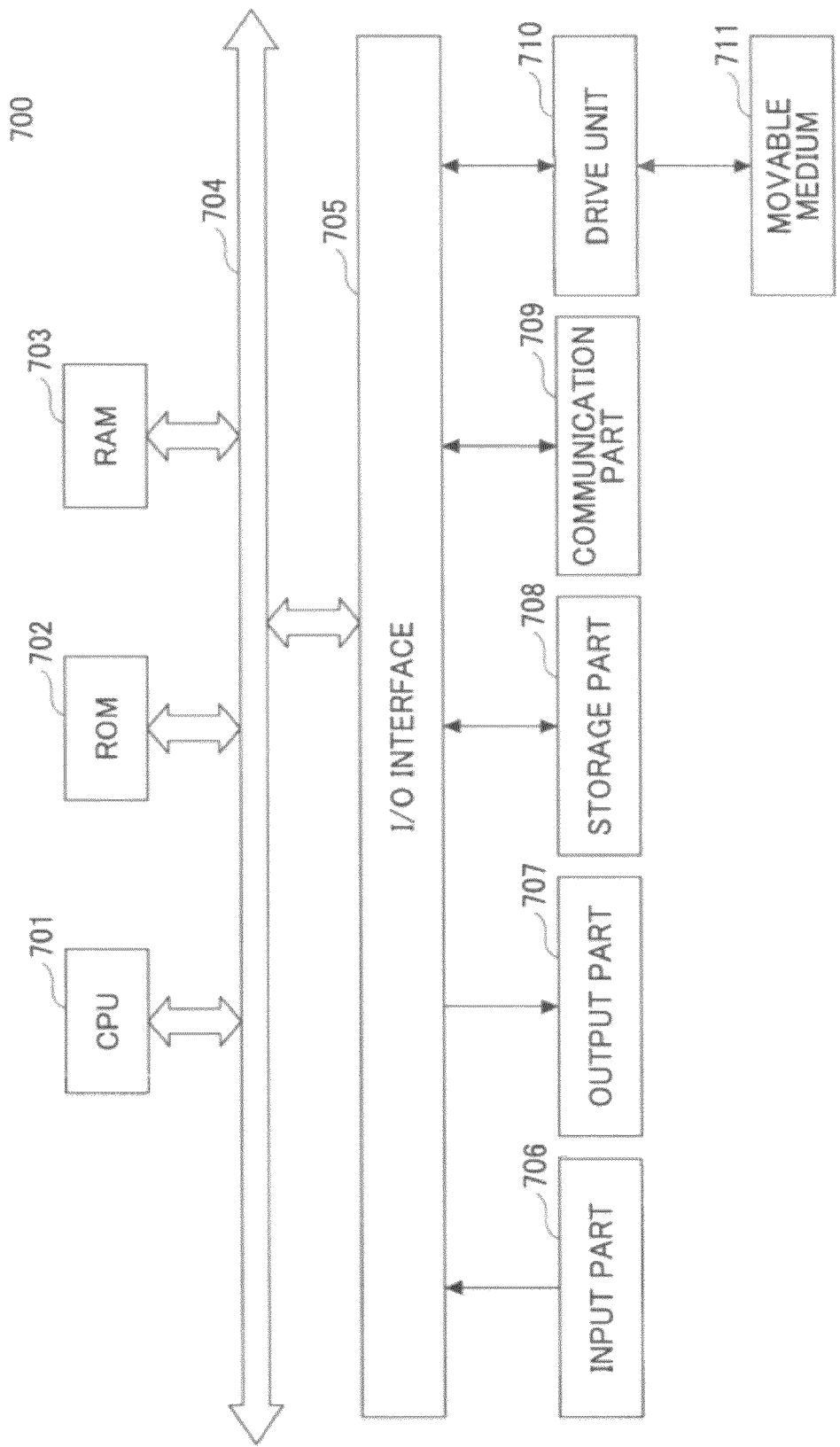

WHITE BALANCE METHOD AND WHITE BALANCE DEVICE

BACKGROUND OF THE INVENTION

1. Field of the Invention

The present invention generally relates to image processing, and more particularly relates to a white balance method and a white balance device for carrying out white balance with regard to an image.

2. Description of the Related Art

In image processing, it is often necessary to carry out white balance processing and/or color enhancement processing with regard to an image.

In particular, in a case of capturing a whiteboard image, it is often necessary to carry out color correction processing such as white balance correction with regard to the whiteboard image.

Up to now, a few technologies of white balance processing have been proposed. In the below cited reference No. 1, a technology of whiteboard image processing including region recognition, white balance, etc., is proposed. The white balance method includes a step of dividing a whiteboard image into plural small blocks; a step of ranking brightness of pixels forming each of the plural small blocks; a step of calculating or presuming background color of each of the plural small blocks so as to make up background color of the whole whiteboard image; and a step of carrying out the white balance by using the background color of the whole whiteboard image.

In the below cited reference No. 2, an algorithm of carrying out white balance by seeking gray color points in a YUV color space is described. In the YUV color space, the gray color points are found based on a condition of $$F(Y, U, V) = \frac{(|U| + |V|)}{Y} < T.$$

After the gray color points are found, it is possible to obtain color deviation information, and then the white balance is carried out according to the color deviation information.

In addition, in the below cited reference No. 3, a method of carrying out white balance by using a human face is disclosed. In general, skin color of human beings is within a predetermined color range. As a result, by seeking the human face according to human face recognition, it is possible to acquire the skin color of the human face. After acquiring the skin color of the human face, the white balance is carried out by using the color deviation between the skin color of the human face and existing data of skin color.

In an image captured by, for example, a whiteboard sharing system (i.e., a system by which plural meeting rooms may share a same whiteboard remotely), the color of the whiteboard has deviation due to, for example, inaccurate white balance of a camera head. As result, it is often necessary to carry out white balance processing with regard to the image captured by the camera head.

Furthermore, in a conventional white balance system, color correction is carried out with regard to all pixels of an image by adopting a unified color correction parameter in general.

However, the inventors of the present invention found that, for example, under a complicated lighting condition, a captured image (for example, a whiteboard image) often has the following characteristics: as shown in FIG. 1, some portions are brighter; some portions are darker; color tone of some portions tends to be warm; and color tone of some portions tends to be cool. At this time, if only one global color correction parameter is adopted to carry out the color correction with regard to the captured image, then it may be impossible to better correct color deviation, and impossible to obtain a whiteboard image approaching that of a real whiteboard.

Cited Reference No. 1: Zhengyou Zhang and Li-wei He, *Whiteboard Scanning and Image Enhancement, Microsoft Research*, Technical Report MSR-TR-2003-39, June 2003

Cited Reference No. 2: Jun-yan Huo, Yi-lin Chang, Jing Wang, and Xiao-xia Wei, "*Robust Automatic White Balance Algorithm using Gray Color Points in Images*", IEEE Transactions on Consumer Electronics, Vol. 52, No. 2, Pages 541-546, May 2006

Cited Reference No. 3: US Patent Application Publication NO. 2004/0208363 A1

SUMMARY OF THE INVENTION

In order to solve the above described problems, the present invention provides a white balance device and a white balance method for carrying out white balance with regard to an image as well as a color adjustment method of adjusting color of plural background pixels of an image.

According to one aspect of the present invention, a white balance device for carrying out white balance with regard to an image is provided. The white balance device comprises a background pixel extraction unit used to extract plural background pixels of the image; a representative-color-of-background obtaining unit used to obtain representative color of background of the image based on the extracted background pixels; a global magnification ratio calculation unit used to determine a global magnification ratio of the background pixels based on predetermined expected background color and the representative color of background; a color pre-adjustment unit used to carry out pre-adjustment with regard to original color of each of the background pixels by using the global magnification ratio so as to obtain pre-adjusted color of the corresponding background pixel; an accurate magnification-ratio-of-background-pixel calculation unit used to, for each of the background pixels, determine expected final background color of the corresponding background pixel based on the pre-adjusted color of the corresponding background pixel, and then determine an accurate magnification ratio of the corresponding background pixel based on the expected final background color and the original color of the corresponding background pixel; and an accurate color adjustment unit used to, for each of the background pixels, carry out adjustment with regard to the original color of the corresponding background pixel by using the accurate magnification ratio of the corresponding background pixel.

According to another aspect of the present invention, a white balance method of carrying out white balance with regard to an image is provided. The white balance method comprises a background pixel extraction step of extracting plural background pixels of the image; a representative-color-of-background obtaining step of obtaining representative color of background of the image based on the extracted background pixels; a global magnification ratio calculation step of determining a global magnification ratio of the background pixels based on predetermined expected background color and the representative color of background; a color pre-adjustment step of carrying out pre-adjustment with regard to original color of each of the background pixels by using the global magnification ratio so as to obtain pre-adjusted color of the corresponding background pixel; an accurate magnification-ratio-of-background-pixel calculation step of, for each of the background pixels, determining expected final background color of the corresponding background pixel based on the pre-adjusted color of the corresponding background pixel, and then determining an accurate magnification ratio of the corresponding background pixel based on the expected final background color and the original color of the corresponding background pixel; and an accurate color adjustment step of, for each of the background pixels, carrying out adjustment with regard to the original color of the corresponding background pixel by using the accurate magnification ratio of the corresponding background pixel.

According to still another aspect of the present invention, a color adjustment method of adjusting color of plural background pixels of an image is provided. The color adjustment method comprises a background pixel extraction step of extracting the plural background pixels of the image; a representative-color-of-background obtaining step of obtaining representative color of background of the image based on the extracted background pixels; a global magnification ratio calculation step of determining a global magnification ratio of the background pixels based on predetermined expected background color and the representative color of background; a color pre-adjustment step of carrying out pre-adjustment with regard to original color of each of the background pixels by using the global magnification ratio so as to obtain pre-adjusted color of the corresponding background pixel; and an accurate color adjustment step of, for each of the background pixels, carrying out adjustment with regard to the pre-adjusted color of the corresponding background pixel so as to match a predetermined color feature of the predetermined expected background color of the corresponding background pixel so that expected final background color of the corresponding background pixel is obtained.

As a result, according to the above described white balance device, white balance methods, and color adjustment method, it is possible to obtain a whiteboard image more closely approaching that of a real whiteboard by adopting the global adjustment step and the delicate pixel-by-pixel adjustment step to carry out the white balance processing.

BRIEF DESCRIPTION OF THE DRAWINGS

FIG. 1 illustrates an original whiteboard image and a whiteboard image captured by a camera head under a complicated lighting condition;

FIG. 6 illustrates a block diagram of a white balance device according to an embodiment of the present invention; and FIG. 7 illustrates a computer system according to an embodiment of the present invention.

DETAILED DESCRIPTION OF THE PREFERRED EMBODIMENTS

Hereinafter, various embodiments of the present invention will be concretely described with reference to the drawings. Here it should be noted that the same symbols, which are in the specification and the drawings, stand for constructional elements having the same or basically-same function and structure, and repeated explanations for the constructional elements are omitted in the specification.

In order to easily understand and describe the embodiments of the present invention, first an overall concept of the present invention is illustrated as follows. By taking into account unbalanced expressions of a whiteboard image captured under a complicated lighting condition, it may be considered that it is impossible to correct color by carrying out global color correction so as to let the color satisfy requirements. For this reason, two steps are adopted to carry out adjustment in the embodiments of the present invention. A first step is carrying out global color correction so as to let the corrected color approach an expected correction goal. A second step is carrying out delicate pixel-by-pixel color correction so as to let the corrected color coincide with the correction goal.

In addition, in order to easily understand and describe the embodiments of the present invention, in what follows, a whiteboard image is taken as an example serving as a target of the white balance processing. However, it should be noted that the present invention is not limited to this; in other words, a document image, etc. may be the target of the white balance processing too.

Furthermore, in what follows, color of pixels is expressed by using a RGB (i.e., red, green, and blue) color model; however, it should be apparent that other color models, for example, a HSV color model and a HLS color model, may also be used in the embodiments of the present invention.

Figure 2:
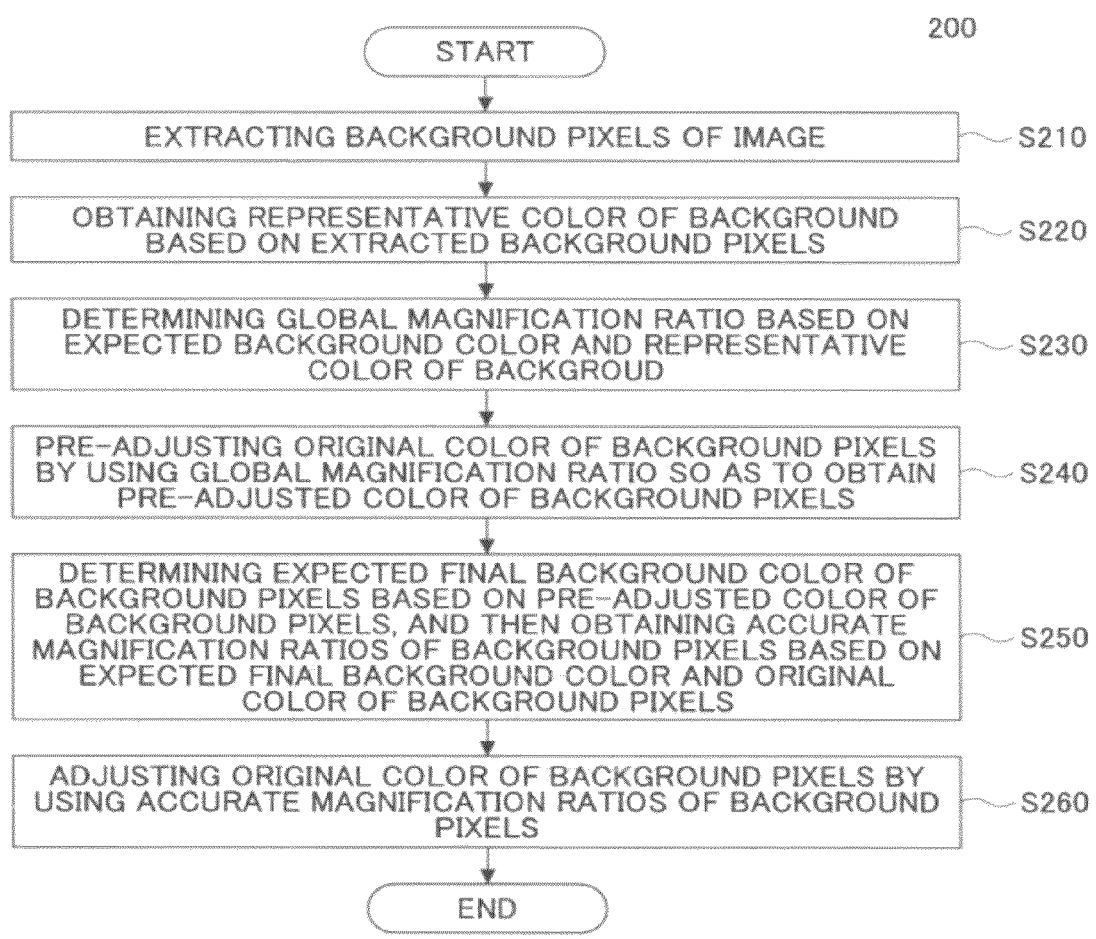
FIG. 2 is an overall flowchart of a white balance method according to an embodiment of the present invention.

FIG. 2 is an overall flowchart of a white balance method according to an embodiment of the present invention.

As shown in FIG. 2, in STEP S210, background pixels of an image are extracted. Here it should be noted that it is possible to employ various conventional binary image processing methods to determine that a pixel of an image is a background pixel or a foreground pixel. For example, as for a whiteboard image, brightness of a background pixel is higher than that of a foreground pixel in general. As a result, it is possible to select, based on, for example, experience or experiment, a brightness threshold value by which a pixel of the whiteboard image may be determined as the background pixel or the foreground pixel. For example, if brightness of a pixel of the whiteboard image is higher than or equal to the brightness threshold value, then this pixel is the background pixel; otherwise this pixel is the foreground pixel. In addition, it should be noted that any other background pixel extraction methods, for example, the background pixel extraction methods used in the references cited in the background of the invention, may be adopted in the embodiments of the present invention.

In STEP S220, representative color of background is obtained based on the extracted background pixels. The representative color of background refers to color that may represent color features of most of the background pixels. For example, it is possible to calculate an average color value of all the background pixels, and then let the average color value be the representative color of background. Again, for example, it is also possible to rank all the background pixels in order of brightness, and take the color of the centrally-positioned pixel to serve as the representative color of background. In addition, before calculating the average color value of all the background pixels, for example, it is possible to remove so-called "outliers" i.e. points dramatically departing from an expected range of background pixels. Furthermore, as an alternative approach of calculating the average color value of all the background pixels, it is possible to divide the image into plural blocks, then select one or more pixels from each of the plural blocks, and then calculate an average color value or a centrally-positioned color value of all of the selected pixels so as to let this average color value or this centrally-positioned color value serve as the representative color of background.

In STEP S230, a global magnification ratio of the background pixels is determined based on expected background color and the representative color of background.

As for the expected background color, if a whiteboard is taken as an example, the expected background color should be color of the whiteboard under a condition of normal environmental lights. The expected background color may be determined based on experience; for example, it is possible to consider that color of some whiteboards is white, and color of some whiteboards is gray. Again, for example, it is also possible to capture an image of the whiteboard by using a high-performance camera head under a condition of ideal lights, and to determine the expected background color based on the captured whiteboard image. Here it should be noted that various methods of obtaining the expected background color may be adopted in the embodiments of the present invention; in other words, the present invention is not limited to the methods descried in this specification.

In what follows, the average background color is expressed as $C_{average}$, and $C_{average}=(R_{average}, G_{average}, B_{average})$. The expected background color is expressed as $C_{expected}$, and $C_{expected}=(R_{expected}, G_{expected}, B_{expected})$.

As an example, in a whiteboard sharing system, the expected background color $C_{expected}$ is R=G=B (standard gray), and its intensity of color is 200. Of course, this is only an example; in other words, the expected background color may be other values due to different environments and/or different systems.

If the global magnification ratio is expressed as K1, then K1 may be obtained, for example, by utilizing the average background color and the expected background color as follows.

$$K1 = C_{expected}/C_{average} = (R_{expected}/R_{average}, G_{expected}/G_{average}, B_{expected}/R_{average}) \quad (1)$$

The above described method of calculating the global magnification ratio is the simplest one. In other words, in different environments, there may be various calculation methods; for example, it is possible to carry out normalization processing with regard to the result calculated by using the above equation (1).

The global magnification ratio K1 is used for pre-adjusting RGB values of the background pixels so as to cause the RGB values to approach the expected background color.

In STEP S240, original color of each of the background pixels is pre-adjusted by using the global magnification ratio so as to obtain the pre-adjusted color of the corresponding background pixel.

If the original color of each of the background pixels, for example, color of each of pixels of a whiteboard image captured by a camera head, is expressed as C(i, j), and the pre-adjusted color of the corresponding background pixel is expressed as $C_{temp(i,j)}$, then the globally adjusted color may be obtained as follows.

$$C_{temp(i,j)} = K1 * C(i,j) \quad (2)$$

In STEP S250, for each of the background pixels, its expected final background color is determined based on the pre-adjusted color of the corresponding background pixel, and then its accurate magnification ratio is determined based on the expected final background color and the original color of the corresponding background pixel (for example, based on a ratio of the expected final background color to the original color of the corresponding background pixel).

Generally speaking, the background color pre-adjusted by using the global magnification ratio cannot be equal to the expected background color; that is, in different lighting areas, color deviation exists. As a result, it is necessary to carry out accurate adjustment with regard to the pre-adjusted color so as to let the corresponding background pixel have an expected color attribute.

The expected color attribute of the expected background color may be different in different environments. For example, in a whiteboard sharing system, it may be desired that intensities of R, G, and B are the same. Again, for example, in other cases, it may be desired that intensities of R, G, and B satisfy a proportion of 2:1:1 or other proportions. Furthermore, in some cases, it may be desired that intensity of G is not equal to or less than the average of intensities of R and B.

As an example, in a whiteboard sharing system, the globally adjusted color $C_{temp(i,j)}$ is adjusted again by using the following equation (3).

That is, by letting R, G, and B satisfy a relationship of R=G=B=(R+G+B)/3, the expected final background color $C_{bgadjusted(i,j)}$ may be obtained.

$$C_{temp(i,j)} \xrightarrow{R=G=B} C_{bgadjusted(i,j)} \quad (3)$$

Furthermore it is possible to acquire the accurate magnification ratio K2(i, j) of each of the background pixels by employing the following equation (4) based on the expected finale background color $C_{bgadjusted(i,j)}$ and the original color C(i, j) of the corresponding background pixel.

$$K2(i,j) = C_{bgadjusted(i,j)}/C(i,j) \quad (4)$$

Optionally, after acquiring the accurate magnification ratio K2(i, j) of each of the background pixels as above, it is possible to, for each of the background pixels, adjust its accurate magnification ratio based on the accurate magnification ratios of its surrounding background pixels so that noise influence, etc., may be reduced. As an example, it is possible to carry out block averaging with regard to the above mentioned accurate magnification ratio K2(i, j) of each of the background pixels so as to filter out noise influence, etc.; in this way, a modified accurate magnification ratio K3(i, j) of the corresponding background pixel may be obtained as follows.

$$K3(i,j) = avg(K2(m,n))(i-k \le m \le i+k, j-k \le n \le j+k) \quad (5)$$

Figures 4, 5:
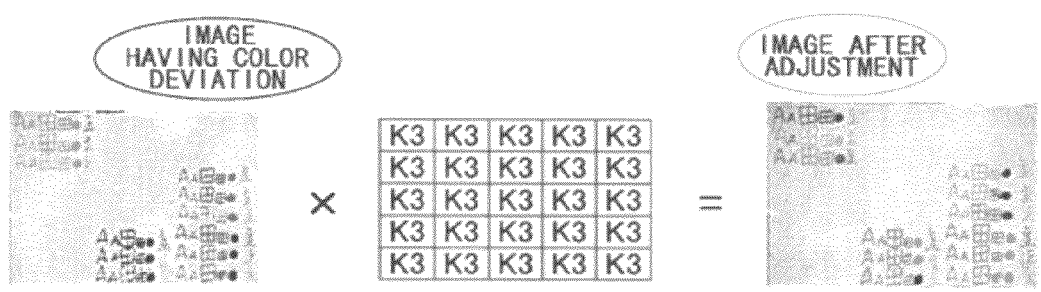
FIG. 4 illustrates an example of a block when adjusting an accurate magnification ratio of a background pixel by using a block averaging method, according to an embodiment of the present invention.
FIG. 5 illustrates an operational process of adjusting color of each of plural pixels by utilizing an accurate magnification ratio of the corresponding pixel.

Here (i, j) refers to a target background pixel whose accurate magnification ratio needs to be modified; (m, n) refers to selected background pixels by which the target background pixel (i, j) is modified; and k refers to a range of the selected background pixels, and is a positive integer. For example, when k=2, a block including 25 pixels is obtained as shown in FIG. 4 where the pixels labeled with K2 and K3 are background pixels, the pixels labeled with nothing are foreground pixels, and the centrally-positioned pixel labeled with K3 is a target background pixel whose accurate magnification ratio needs to be modified.

In addition, as for this block averaging method, when calculating the average magnification ratio of the background pixels (m n), it is also possible to multiply the magnification ratios of the background pixels (m n) having different distances from the target background pixel (i, j) by different weighted values; for example, the nearer the background pixel is to the target background pixel (i, j), the greater the weighted value of the background pixel is.

In STEP S260, the original color of each of the background pixels is adjusted by employing the accurate magnification ratio of the corresponding background pixel. For example, as for each of the background pixels, a value obtained by multiplying its original color by its accurate magnification ratio may serve as a result of carrying out white balance with regard to the corresponding background pixel.

Here it should be noted that if the white balance processing is just carried out with regard to a background image, then it is apparent that it is possible not to calculate the accurate magnification ratio; in other words, after the expected final background color of each of the background pixels is determined in STEP S250, it is possible to adjust the original color of the corresponding background pixel directly to its expected final background color. If it is necessary to carry out further adjustment based on the surrounding pixels, for example, to carry out the block averaging, then it is possible to carry out the block averaging directly with regard to the color of the background pixels instead of the accurate magnification ratios of the background pixels; in this way, possibly existing noise may be removed.

Furthermore, in most cases, it is also possible to carry out white balance processing with regard to foreground pixels; at this time, the above mentioned accurate magnification ratios of the background pixels are necessary.

Figure 3:
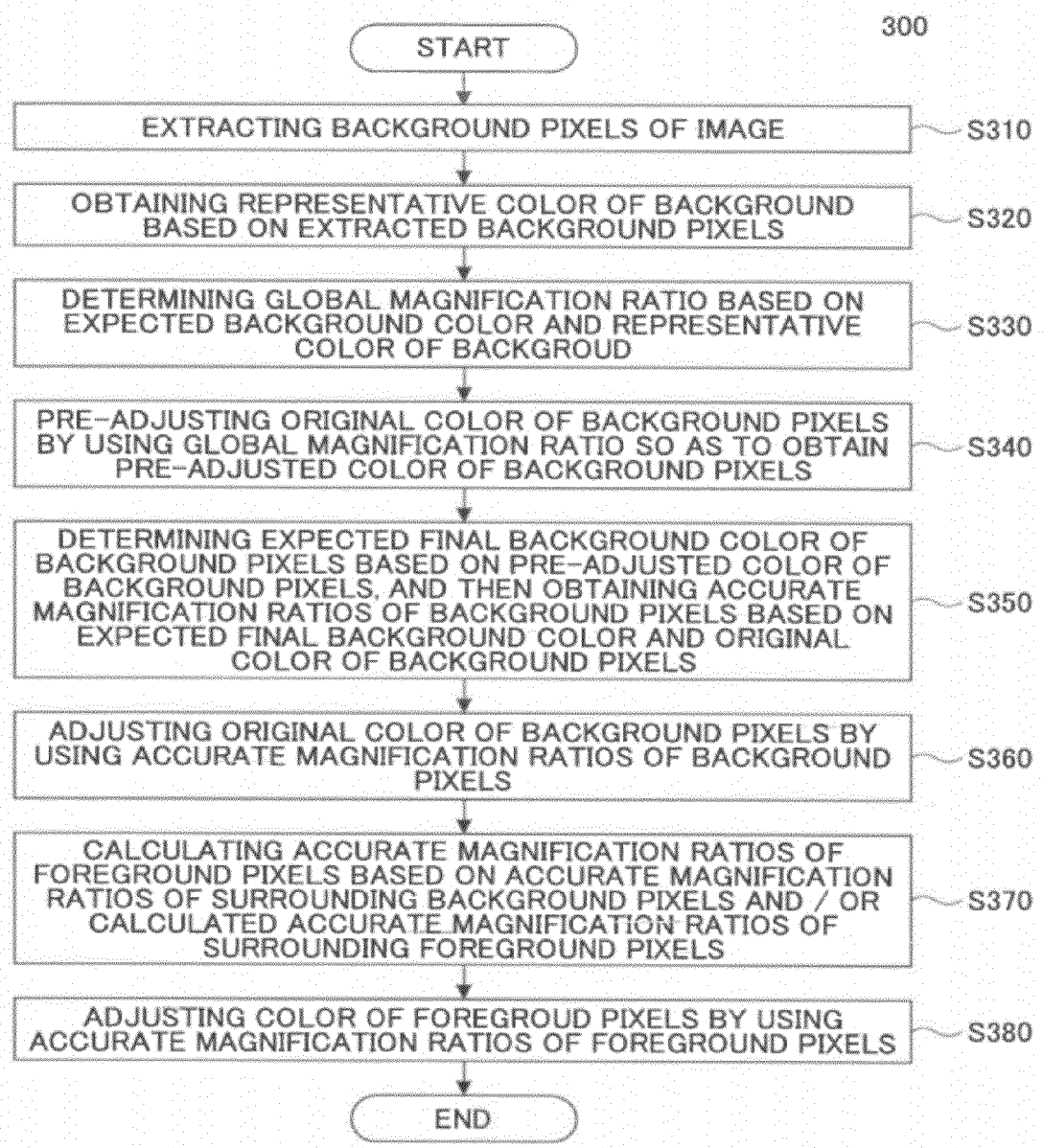
FIG. 3 is an overall flowchart of a white balance method according to another embodiment of the present invention.

FIG. 3 is an overall flowchart of a white balance method according to another embodiment of the present invention.

In the other embodiment, white balance processing is carried out with regard to both background pixels and foreground pixels.

Here it should be noted that since STEPS S310 to S360 in FIG. 3 are the same with STEPS S210 to S260 in FIG. 2, descriptions of STEPS S310 to S360 are omitted. In other words, the difference between the white balance method shown in FIG. 3 and that shown in FIG. 2 is that STEPS S370 and S380 are added as shown in FIG. 3. As a result, in what follows, only STEPS S370 and S380 of FIG. 3 are illustrated in detail.

In STEP S370, as for each of the foreground pixels, its accurate magnification ratio is calculated based on accurate magnification ratios of its surrounding background pixels and/or calculated accurate magnification ratios of its surrounding foreground pixels.

For example, the accurate magnification ratio $K3(i, j)$ of each of the foreground pixels may be obtained by calculating the average of modified magnification ratios of its surrounding pixels, as shown in the following equation (6). Since it is impossible to directly obtain an accurate magnification ratio of a foreground pixel, it is necessary to calculate the accurate magnification ratio of the foreground pixel by employing modified magnification ratios of its surrounding pixels.

$$K3(i,j)=\text{avg}(K3(m,n))(i-k<m<i+k, j-k<n<j+k) \quad (6)$$

Here (i, j) refers to a target foreground pixel whose accurate magnification ratio needs to be calculated; (m, n) refers to selected surrounding background pixels or foreground pixels whose accurate magnification ratios have been calculated; and k refers to a range of the selected surrounding pixels, and is a positive integer.

Here it should be noted that the above equation (6) is just an example. In other words, when calculating the average value, it is also possible to introduce different weighted values into the surrounding pixels having different distances from the target foreground pixel; for example, the nearer the surrounding pixel is to the target foreground pixel, the greater the weighted value of the surrounding pixel is.

In STEP S380, the color of each of the foreground pixels is adjusted by using the accurate magnification ratio of the corresponding foreground pixel. For example, the finally adjusted color of each of the foreground pixels may be calculated by using the following equation (7).

$$C_{adjusted(i,j)}=K3(i,j)*C(i,j) \quad (7)$$

Here $C(i, j)$ refers to the original color of a foreground pixel (i, j), for example, the color captured by a camera, and $C_{adjusted(i,j)}$ refers to the adjusted color of the foreground pixel.

FIG. 5 illustrates an operational process of adjusting color of each of plural pixels by utilizing an accurate magnification ratio of the corresponding pixel.

As shown in FIG. 5, after an original image having color deviation is adjusted by using the accurate magnification ratios, an image having a good effect is obtained.

The operational process of the white balance method shown in FIG. 3 is just an example; the respective steps of FIG. 3 do not need to be always carried out in order of time as shown in FIG. 3. In other words, the order of some steps may be changed. For example, in FIG. 3, STEP S370 may be carried out before STEP S360. In addition, some steps may be combined. For example, in FIG. 3, STEP S360 and STEP S370 may be combined as one step so as to adjust the original color of all the pixels including the background pixels and the foreground pixels based on the final accurate magnification ratios; in this way, the result of the white balance processing may be obtained too. To sum it up, the above white balance processing method described by referring to FIG. 3 is just provided as an embodiment so as to cause those people skilled in the art to understand the present invention; that is, the present invention is not limited to this embodiment.

Furthermore, according to still another embodiment of the present invention, a color adjustment method of adjusting color of background pixels of an image is provided. The color adjustment method comprises a step of extracting the background pixels of the image; a step of obtaining representative color of background based on the extracted background pixels; a step of determining a global magnification ratio based on expected background color and the representative color of background; a step of carrying out pre-adjustment with regard to original color of each of the background pixels based on the global magnification ratio; and a step of, for each of the background pixels, carrying out color adjustment with regard to the pre-adjusted color of the corresponding background pixel so as to match a predetermined color feature of the expected background color of the corresponding background pixel so that expected final background color of the corresponding background color of the corresponding background is obtained.

FIG. 6 illustrates a block diagram of a white balance device according to an embodiment of the present invention.

As shown in FIG. 6, the white balance device 600 used to carry out white balance processing with regard to an image comprises a background pixel extraction unit 601 used to extract background pixels of the image; a representative-color-of-background obtaining unit 602 used to obtain representative color of background based on the extracted background pixels; a global magnification ratio calculation unit 603 used to determine a global magnification ratio of the backgrounds based on expected background color and the representative color of background; a color pre-adjustment unit 604 used to carry out pre-adjustment with regard to original color of each of the background pixels based on the global magnification ratio so as to obtain pre-adjusted color of the corresponding background pixel; an accurate magnification-ratio-of-background-pixel calculation unit 605 used to, for each of the background pixels, determine expected final background color of the corresponding background pixel based on the pre-adjusted color of the corresponding background pixel, and determine accurate magnification ratio of the corresponding background pixel based on the expected final background color and the original color of the corresponding background color; and an accurate color adjustment unit 606 used to carry out color adjustment with regard to the original color of each of the background pixels by using the accurate magnification ratio of the corresponding background pixel.

The white balance device 600 further comprises an accurate magnification-ratio-of-foreground-pixel calculation unit used to, for each of foreground pixels, calculate an accurate magnification ratio of the corresponding foreground pixel based on the accurate magnification ratios of the surrounding background pixels of the corresponding foreground pixel and/or the calculated accurate magnification ratios of the surrounding foreground pixels of the corresponding foreground pixel. In addition, the accurate color adjustment unit 606 may be used to adjust the color of each of the foreground pixels based on the accurate magnification ratio of the corresponding foreground pixel.

The representative-color-of-background obtaining unit 602 may be used to calculate average background color based on the extracted background pixels so as to let the average background color serve as the representative color of background, or rank the extracted background pixels in order of brightness so as to let the color of the centrally-positioned background pixel be the representative color of background.

The image may be an image of a whiteboard captured by a camera head. The white balance device 600 further comprises an expected color obtaining unit used to obtain the expected background color based on an image of a blank whiteboard captured by a camera head under a predetermined lighting condition.

The accurate magnification-ratio-of-background calculation unit 605 may comprise a second color adjustment unit used to, for each of the background pixels, adjust the pre-adjusted color of the corresponding background pixel so as to match a predetermined color feature of the expected background color of the corresponding pixel so that the expected final background color of the corresponding background pixel in obtained.

The white balance device 600 may further comprise an accurate magnification ratio adjustment unit used to, for each of the background pixels, adjust the accurate magnification ratio of the corresponding background pixel based on the accurate magnification ratios of the surrounding background pixels of the corresponding background pixel.

FIG. 7 illustrates a computer system according to an embodiment of the present invention.

The computer system shown in FIG. 7 is an example for realizing a hardware configuration of the above described white balance device.

As shown in FIG. 7, a central processing unit (CPU) 701 carries out various processing based on programs stored in a read-only memory (ROM) 702 or a storage part 708. For example, the CPU 701 executes a program for carrying out white balance processing with regard to an image described in the above embodiments. A random access memory (RAM) 703 stores programs, data, etc., executed by the CPU 701. The CPU 701, the ROM 702, and the RAM 703 are connected via a bus 704.

The CPU 701 is connected to an I/O interface 705. An input part 706 including a keyboard, a mouse, a microphone, etc., and an output part 707 including a monitor, a speaker, etc., are connected to the I/O interface 705. The CPU 701 executes the various processing based on instructions input from the input part 706, and then outputs results to the output part 707.

The storage part 708 connected to the I/O interface 705 includes, for example, a hard disk, and stores the programs and various data executed by the CPU 701. A communication part 709 communicates with external devices via, for example, the Internet, a local area network, etc.

A drive unit 710 connected to the I/O interface 705 drives a movable medium 711 such as a hard disk, an optical disk, a magneto-optical disk, a semiconductor memory, etc., and obtains programs and data recorded therein. The obtained programs and data, when needed, are sent to the storage part 708, and are stored therein.

Up to here, the basic principle of the present invention has been illustrated based on the above described embodiments. However, it should be noted that those skilled in the art may understand that all or parts of the method and the device in the embodiments of the present invention may be achieved by hardware, firmware, software, or their combination in any calculation devices (including processors, storage units, etc.) or networks having the calculation devices. This can be realized by those people skilled in the art based on using their basic programming skills after reading this specification.

Therefore the aim of the present invention may be achieved by executing a program or a set of programs in any calculation devices. The calculation devices may be any known common devices. In addition, the aim of the present invention may also be achieved only by providing program products including program codes for realizing the method or the function of the device. In other words, these kinds of program products may make up the present invention, and storage media storing these kinds of program products may make up the present invention too. It is apparent that the storage media may be any known storage media or any storage media that will be developed in the future.

Furthermore it should be noted that in the method and the device of the embodiments of the present invention, it is apparent that the various steps or the various units may be disassembled and/or recombined. These kinds of disassembly and/or recombination should be considered as equivalent proposals of the present invention. In addition, the steps in the method of the embodiments of the present invention may be naturally carried out according to the illustrated order in time. However, it is not always necessary to carry out the steps in a time order; that is, the order of some steps may be changed.

While the present invention is described with reference to the specific embodiments chosen for purpose of illustration, it should be apparent that the present invention is not limited to these embodiments, but numerous modifications could be made thereto by those people skilled in the art without departing from the basic concept and scope of the present invention.

The present application is based on Chinese Priority Patent Application No. 201010501074.5 filed on Oct. 9, 2010, the entire contents of which are hereby incorporated by reference.

What is claimed is:

1. A white balance device for carrying out white balance with regard to an image, comprising:
a background pixel extraction unit used to extract plural background pixels of the image;
a representative-color-of-background obtaining unit used to obtain representative color of background of the image based on the extracted background pixels;

a global magnification ratio calculation unit used to determine a global magnification ratio of the background pixels based on predetermined expected background color and the representative color of background;

a color pre-adjustment unit used to carry out pre-adjustment with regard to original color of each of the background pixels by using the global magnification ratio so as to obtain pre-adjusted color of the corresponding background pixel;

an accurate magnification-ratio-of-background-pixel calculation unit used to, for each of the background pixels, determine expected final background color of the corresponding background pixel based on the pre-adjusted color of the corresponding background pixel, and then determine an accurate magnification ratio of the corresponding background pixel based on the expected final background color and the original color of the corresponding background pixel; and an accurate color adjustment unit used to, for each of the background pixels, carry out adjustment with regard to the original color of the corresponding background pixel by using the accurate magnification ratio of the corresponding background pixel.

2. The white balance device according to claim 1, further comprising:

an accurate magnification-ratio-of-foreground-pixel calculation unit used to, for each of plural foreground pixels, calculate an accurate magnification ratio of the corresponding foreground pixel based on accurate magnification ratios of surrounding background pixels of the corresponding foreground pixel and/or calculated accurate magnification ratios of surrounding foreground pixels of the corresponding foreground pixel, wherein, the accurate color adjustment unit further carries out adjustment with regard to color of each of the foreground pixels by using the accurate magnification ratio of the corresponding foreground pixel.

3. The white balance device according to claim 1, wherein: the representative-color-of-background obtaining unit calculates average background color based on the extracted background pixels so as to let the average background color serve as the representative color of background, or ranks the extracted background pixels in order of brightness so as to let color of a centrally-positioned background pixel serve as the representative color of background.

4. The white balance device according to claim 1, wherein: the image is a captured whiteboard image; and the white balance device further comprises an expected color obtaining unit used to obtain the predetermined expected background color based on an image of a blank whiteboard captured by a camera satisfying a predetermined requirement under a predetermined condition.

5. The white balance device according to claim 1, wherein: the accurate magnification-ratio-of-background-pixel calculation unit includes:

a second color adjustment unit used to, for each of the background pixels, adjust the pre-adjusted color of the corresponding background color so as to match a predetermined color feature of the predetermined expected background color of the corresponding background pixel so that expected final background color of the corresponding background pixel is obtained.

6. The white balance device according to claim 5, further comprising:

an accurate magnification ratio adjustment unit used to, for each of the background pixels, adjust the accurate magnification ratio of the corresponding background pixel based on accurate magnification ratios of surrounding background pixels of the corresponding background pixel.

7. A white balance method of carrying out white balance with regard to an image, comprising:

a background pixel extraction step of extracting plural background pixels of the image;

a representative-color-of-background obtaining step of obtaining representative color of background of the image based on the extracted background pixels;

a global magnification ratio calculation step of determining a global magnification ratio of the background pixels based on predetermined expected background color and the representative color of background;

a color pre-adjustment step of carrying out pre-adjustment with regard to original color of each of the background pixels by using the global magnification ratio so as to obtain pre-adjusted color of the corresponding background pixel;

an accurate magnification-ratio-of-background-pixel calculation step of, for each of the background pixels, determining expected final background color of the corresponding background pixel based on the pre-adjusted color of the corresponding background pixel, and then determining an accurate magnification ratio of the corresponding background pixel based on the expected final background color and the original color of the corresponding background pixel; and an accurate color adjustment step of, for each of the background pixels, carrying out adjustment with regard to the original color of the corresponding background pixel by using the accurate magnification ratio of the corresponding background pixel.

8. The white balance method according to claim 7, further comprising:

an accurate magnification-ratio-of-foreground-pixel calculation step of, for each of plural foreground pixels, calculating an accurate magnification ratio of the corresponding foreground pixel based on accurate magnification ratios of surrounding background pixels of the corresponding foreground pixel and/or calculated accurate magnification ratios of surrounding foreground pixels of the corresponding foreground pixel; and an accurate color adjustment step of, for each of the foreground pixels, carrying out adjustment with regard to color of the corresponding foreground pixel by using the accurate magnification ratio of the corresponding foreground pixel.

9. The white balance method according to claim 7, wherein:

average background color is calculated based on the extracted background pixels so that the average background color serves as the representative color of background; or the extracted background pixels are ranked in order of brightness so that color of a centrally-positioned background pixel serves as the representative color of background.

10. A color adjustment method of adjusting color of plural background pixels of an image, comprising:

a background pixel extraction step of extracting the plural background pixels of the image;

a representative-color-of-background obtaining step of obtaining representative color of background of the image based on the extracted background pixels;

a global magnification ratio calculation step of determining a global magnification ratio of the background pixels based on predetermined expected background color and the representative color of background;

a color pre-adjustment step of carrying out pre-adjustment with regard to original color of each of the background pixels by using the global magnification ratio so as to obtain pre-adjusted color of the corresponding background pixel; and an accurate color adjustment step of, for each of the background pixels, carrying out adjustment with regard to the pre-adjusted color of the corresponding background pixel so as to match a predetermined color feature of the predetermined expected background color of the corresponding background pixel so that expected final background color of the corresponding background pixel is obtained.

* * * * *